United States Patent [19]

Kim et al.

[11] Patent Number: 5,379,081
[45] Date of Patent: Jan. 3, 1995

[54] OPTICAL BAFFLING DEVICE

[75] Inventors: Jun-Bae Kim; Seong-Woo Nam, both of Seoul, Rep. of Korea

[73] Assignee: Daewoo Electronics, Co. Ltd., Seoul, Rep. of Korea

[21] Appl. No.: 220,799

[22] Filed: Mar. 31, 1994

[30] Foreign Application Priority Data

Mar. 31, 1993 [KR] Rep. of Korea ............... 1993-5406

[51] Int. Cl.$^6$ ............................................. G03B 21/28
[52] U.S. Cl. ........................................ 353/99; 359/855
[58] Field of Search ................. 353/37, 98, 99, 97, 353/122; 359/197, 198, 223, 224, 850, 851, 855; 348/755, 770, 771; 362/297, 300, 307, 341, 346

[56] References Cited

U.S. PATENT DOCUMENTS

| | | | |
|---|---|---|---|
| 3,504,117 | 3/1970 | Doeringer | 348/770 |
| 3,989,890 | 11/1976 | Nathanson et al. | 348/771 |
| 4,111,538 | 9/1978 | Sheridon | 353/99 |
| 5,245,369 | 9/1993 | Um et al. | 353/37 |
| 5,260,798 | 11/1993 | Um et al. | 348/770 |

FOREIGN PATENT DOCUMENTS 62-115120  5/1987  Japan ........................... 353/98

*Primary Examiner*—William A. Cuchlinski, Jr.
*Assistant Examiner*—William C. Dowling
*Attorney, Agent, or Firm*—Anderson Kill Olick & Oshinsky

[57] ABSTRACT

An improved optical baffling device for use with an optical projection system has a base; a plurality of flat reflective surfaces of an equal size on a corresponding member of reflectors mounted on the base, the reflective surfaces being substantially parallel to each other; and the corresponding number of slits disposed in an alternating relationship with the reflective surfaces. A fraction of light from a light source is focused on each of the reflective surfaces and transmitted to a projection screen through a corresponding slit of the optical baffling device. Sine a fraction of light is processed separately, it becomes possible to enhance the optical efficiency of the optical projection system with a reduced amount of modulation of the optical path.

10 Claims, 2 Drawing Sheets

OPTICAL BAFFLING DEVICE

FIELD OF THE INVENTION

This invention relates to a video display system; and, more particularly, to an improved optical baffling device for use in an optical projection system.

DESCRIPTION OF THE PRIOR ART

Among the various video display systems available in the art, an optical projection system is known to be capable of providing high quality displays in a large scale. In certain of the optical projection systems, a baffle is employed so that light from a lamp is focused on a reflective portion thereof at an oblique angle. The baffle has a pattern comprising reflective and transparent portions on a flat surface thereof. The light reflected from the baffle is collimated by a lens and is uniformly illuminated onto, e.g., an array of M×N actuated mirrors, each of the actuated mirrors including an actuator and a mirror coupled together. The actuators are made of an electrodisplacive material such as a piezoelectric or electrostrictive material which deforms in response to an electrical signal applied thereto.

The reflected light from the array of actuated mirrors is focused back onto the baffle by the lens used for collimating the light. Each of the mirrors in the array of actuated mirrors is in optical alignment with either the reflective or the transparent portion of the baffle. By applying an electrical signal to each of the actuators, the relative position of each of the mirrors to the incident light beam is altered, thereby causing a deviation in the optical path of the reflected beam from each of the mirrors. As the optical path for each of the reflected beams is varied across the reflective and transparent portions of the baffle, the amount of light reflected from each of the mirrors which passes through the transparent portion of the baffle is changed, thereby modulating the intensity of the beam. The modulated beams through the transparent portion are transmitted onto a projection screen via an appropriate optical device such as a projection lens, thereby displaying an image thereon.

In such an optical projection system, the brightness of a spot imaged on the projection screen depends on the amount of light passing through the transparent portion of the baffle, which in turn is controlled by the deformation of each of the actuators.

Consequently, in order to maximize the optical efficiency of the system by utilizing the full intensity of light illuminated on each of the mirrors, the level of deformation exerted by each of the actuators should be large enough to provide a deviation of the optical path across the baffle which is greater than the diameter of the focused light from the lamp.

Since, however, a lamp in actual use is not a point source, and, therefore, its focused light beam is bound to have a physical dimension and the level of deformation of the electrodisplacive material comprising the actuators is inherently limited, the conventional baffle having a structure described above may not be adequate for achieving the maximum optical efficiency of the optical projection system.

SUMMARY OF THE INVENTION

It is, therefore, an object of the invention to provide an optical baffling device having an improved structure for enhancing the optical efficiency of the optical projection system.

In accordance with the present invention, there is provided an optical baffling device for use in an optical projection system comprising:

a base having a first and a second surface; said first surface being on a flat plane;

a plurality of reflective surfaces of an equal-size disposed apart on the first surface of the base for reflecting a light incident thereon, each of the reflective surfaces being on a different flat plane other than said flat plane of the first surface on the base and having a first and a second edges parallel thereto, each of the first edges being equally distanced from and parallel to each other, the intercepting angles between each of the flat planes of the reflective surfaces and the flat plane of the first surface on the base being substantially identical, and the first surface of the base and each of the reflective surfaces not being in a facing relationship; and a corresponding number of slits, to the plurality of the reflective surfaces, for transmitting a light along a direction from the first surface to the second surface of the base, each of the slits being open across said two surfaces of the base and being disposed in an alternating relationship with each of the reflective surfaces.

BRIEF DESCRIPTION OF THE DRAWINGS

The present invention together with its objects and advantages will become more apparent from the following description of preferred embodiments given in conjunction with the accompanying drawings, wherein.

DETAILED DESCRIPTION OF THE PREFERRED EMBODIMENTS

Figure 1:
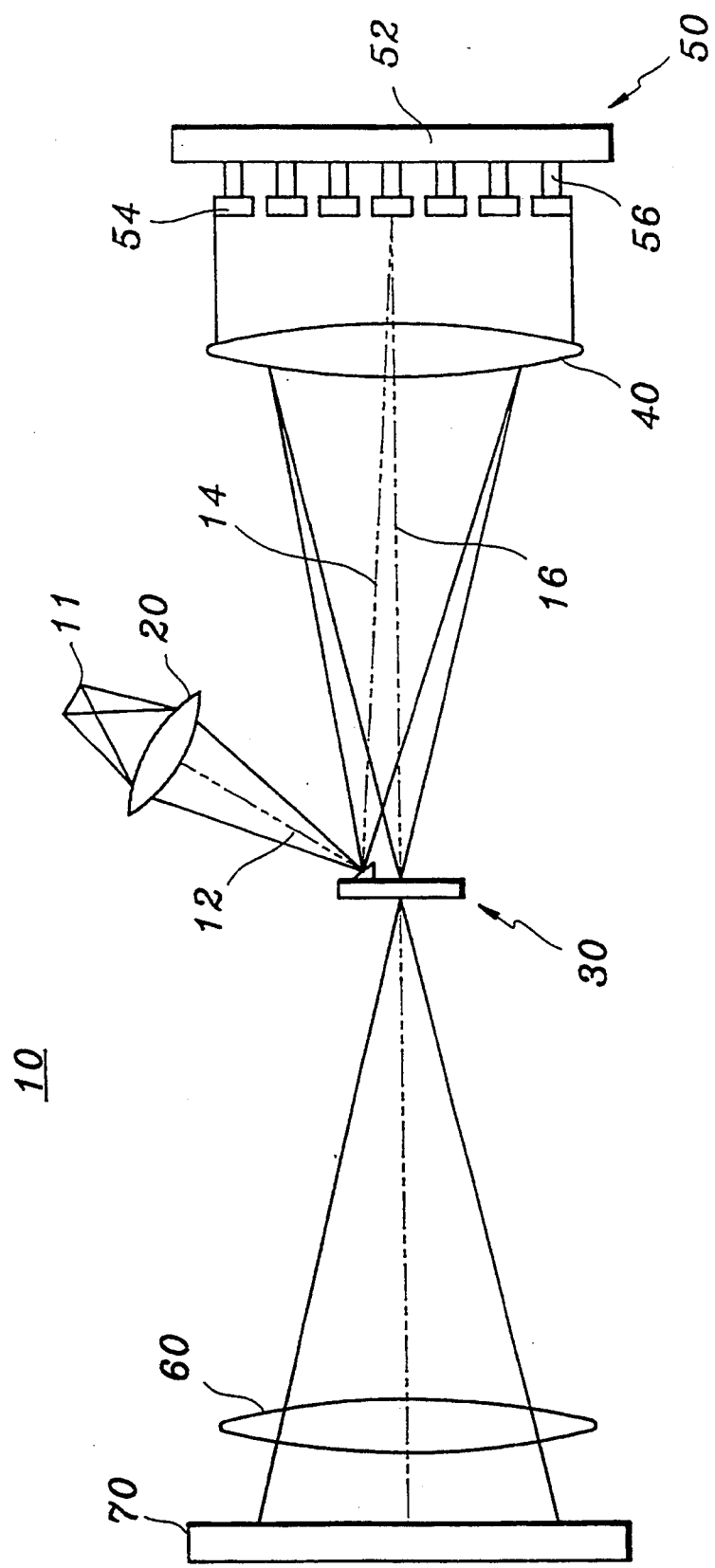
FIG. 1 is a schematic view of an optical projection system comprising an optical baffling device of the present invention.

Referring to FIG. 1, there is shown an optical projection system 10 comprising an optical baffling device 30 in accordance with the preferred embodiment of the invention. Light emanating from a non-point light source 11 is focused along a first optical path 12 onto reflective surfaces of the optical baffling device 30 by a first lens 20. Even though a second and a third optical paths 14 and 16 for one reflective surface of the optical baffling device 30 are depicted in FIG. 1 for the simplicity of illustration, the optical baffling device 30 includes a multiple number of reflective surfaces and a corresponding number of slits in accordance with the invention.

Figure 2:
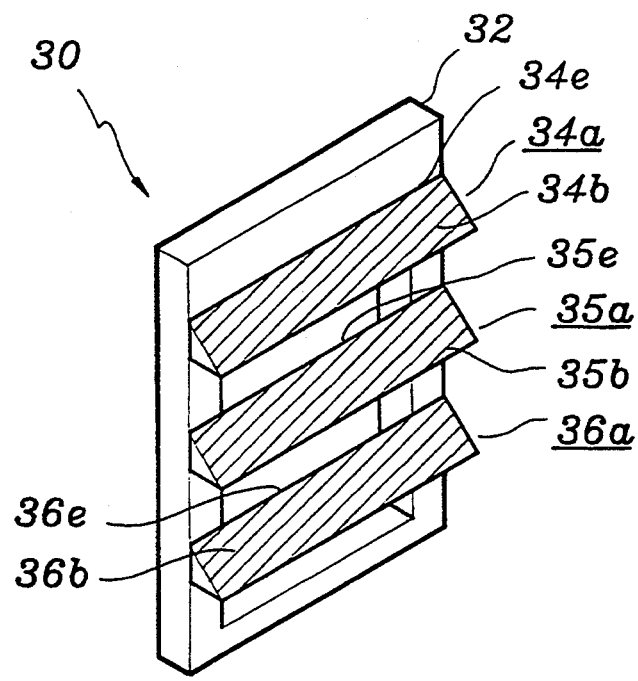
FIG. 2 illustrates a perspective view of the inventive optical baffling device shown in FIG. 1.
Figure 3:
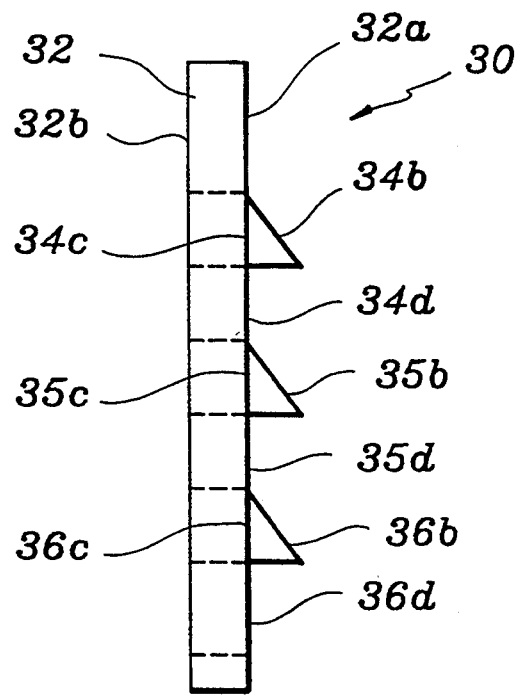
FIG. 3 depicts a schematic cross-sectional view of the optical baffling device shown in FIG. 1.

Details of the optical baffling device 30 are presented in FIGS. 2 and 3. The optical baffling device 30 comprises a base 32, a multiple number, e.g., 3, of reflectors 34a, 35a and 36a, and a corresponding number of slits 34d, 35d and 36d.

The base 32, preferably in the shape of a plate, includes a first flat surface 32a and a second flat surface 32b. In the preferred embodiment of the invention, the second surface 32b is parallel to the first flat surface 32a. The base 32 can be made of a glass.

The reflectors 34a, 35a and 36a, each of which is made of a block of glass having a triangular cross-section, have the flat reflective surfaces 34b, 35b and 36b of an identical size formed by depositing an optically reflective metallic material such as Al on one side thereof; and are disposed apart on the base 30 by mounting one side 34c, 35c and 36c thereof onto the first surface 32a, respectively.

Each of the reflective surfaces intercepts the plane formed by the first flat surface 32a along respective first edges 34e, 35e and 36e thereof; and also includes second edges parallel to the respective first edges. The first edges 34e, 35e and 36e are equally distanced from and partial to each other.

The corresponding number of slits 34d, 35d and 36d are open across the first surface 32a and the second surface 32b of the base 30; and are disposed alternately with the reflective surfaces 34b, 35b and 36b.

Returning to FIG. 1, light from the non-point light source 11 is focused onto the reflective surfaces 34b, 35b and 36b of the optical baffling device 30. The reflective surfaces are in a facing relationship with the first lens 20 and second lens 40. A light beam reflected from each of the reflective surfaces 34b, 35b and 36b diverges along the second optical path 14 and quasi-collimated by the second lens 40, thereby being uniformly illuminated onto, e.g., an array of M×N actuated mirrors 50. Each of the actuated mirrors, which corresponds to each of the pixels to be displayed, includes an actuator 56 mounted on a substrate 52 and a mirror 54 coupled thereto. The optical path of the reflected light from each of the mirrors is determined by the amount of deflection of the mirror, which in turn is controlled by the deformation of the actuator coupled thereto.

The reflected light beams from each of the undeflected mirrors are focused back on an optical baffling 30 by the second lens 40 along the second optical path 14 and stopped by the reflective surfaces 34b, 35b and 36b thereof, whereas the reflected light beams from each of the deflected mirrors are focused by the second lens 40 along a third optical path 16 so that a portion of the focused light beams passes though the slits 34d, 35d and 36d. The light beams from each of the mirrors which pass through the slits are transmitted to a third lens 60 which focuses the transmitted light beams from each of the mirrors on a projection screen 70, thereby displaying each of the pixels corresponding thereto.

It should be noted that the reflected light beams from the reflective surfaces 34b, 35b and 36b are conjugate in a reversing order with the reflected light beams from each of the mirrors: that is, a reflected light beam from the reflective surface 34b is focused back onto 36b and 36d and vice versa.

The intercepting angles formed between the plane of the first flat surface 32a on the base 32 and the reflective surfaces 34b, 35b and 36b, and the spatial arrangement between the non-point light source 11 and the optical baffling device 30 are selected in such a manner that one third of the focused light beams from the non-point light source 11 is focused on each of the reflective surfaces 34b, 35b and 36b.

Each of the intercepting angles has an identical value in the preferred embodiment of the present invention. Since, however, the incident angle of the light beam from the light source focused on each of the reflective surfaces is slightly different from each other, the individual intercepting angle for each of the reflective surfaces can be adjusted to compensate the differences between the incident angles.

As a result, a novel optical baffling device is provided for use with an optical projection system, wherein the light beams focused on a number of reflective surfaces are processed separately, thereby enabling the application of a reduced amount of deformation of an actuator to obtain a required brightness of a pixel which is conducive to the enhancement of the optical efficiency of the optical projection system.

While the present invention has been described with respect to certain preferred embodiments only, other modifications and variations may be made without departing from the scope of the present invention as set forth in the following claims.

What is claimed is:

1. An optical baffling device for use in an optical projection system, comprising:

a base having a first and a second surfaces, said first surface being on a flat plane;

a multiple number of reflective surfaces of an equal size disposed apart on the first surface of the base for reflecting a light incident thereon, each of the reflective surfaces being on a different flat plane other than said flat plane of the first surface on the base and having a first and a second edges parallel thereto, each of the first edges being equally distanced from and parallel to each other, the intercepting angles between each of the flat planes of the reflective surfaces and the flat plane of the first surface on the base being substantially identical, and the first surface of the base and each of the reflective surfaces not being in a facing relationship; and a corresponding multiple number of slits for transmitting a light along a direction from the first surface to the second surface of the base, each of the slits being open across said two surfaces of the base and being disposed in an alternating relationship with each of the reflective surfaces.

2. The optical baffling device according to claim 1, wherein said base is made of a glass.

3. The optical baffling device according to claim 2, wherein each of the reflective surfaces is formed of an optically reflective metallic material deposited on a block of glass.

4. The optical baffling device according to claim 3, wherein said optically reflective metallic material is Al.

5. The optical baffling device according to claim 4, wherein said second surface of the base is parallel to the first surface of the base.

6. The optical baffling device according to claim 1, excepting that each of said intercepting angles between the flat planes of the reflective surfaces and the flat plane of the first surface on the base is identical.

7. The optical baffling device according to claim 6, wherein said base is made of a glass.

8. The optical baffling device according to claim 7, wherein each of the reflective surfaces is formed of an optically reflective metallic material deposited on a block of glass.

9. The optical baffling device according to claim 8, wherein said optically reflective metallic material is Al.

10. The optical baffling device according to claim 9, wherein said second surface of the base is parallel to the first surface of the base.

* * * * *